United States Patent

[11] 3,557,956

| [72] | Inventors | Harry J. Braun<br>Neenah;<br>Stanley A. Dunn, Verona, Wis. |
|---|---|---|
| [21] | Appl. No. | 6,468 |
| [22] | Filed | Jan. 28, 1970 |
| [45] | Patented | Jan. 26, 1971 |
| [73] | Assignee | Bergstrom Paper Company<br>a corporation of Wisconsin. |

[54] METHOD FOR DE-INKING AND REMOVAL OF CERTAIN CONTAMINANTS FROM RECLAIMED PAPER STOCK
10 Claims, 2 Drawing Figs.

[52] U.S. Cl. .................................................. 210/84, 210/512

[51] Int. Cl. ................................................. B01d 21/26
[50] Field of Search ........................................ 210/84, 209, 304, 512; 209/144, 211

*Primary Examiner*—J. L. DeCesare
*Attorney*—James H. Littlepage

ABSTRACT: In centrifugal cleaning and deinking of reclaimed defibered paper stock which contains certain contaminants of about the same specific gravity as the fibers, a fluid is introduced into a slurry of the stock to treat those contaminants selectively and cause them to assume the characteristics of lighter solids so that they are retained in the inner part of the vortex of the cleaner while the fibers migrate to the outer part of the vortex.

INVENTORS
HARRY J. BRAUN
STANLEY A. DUNN

BY *James H. Littlepage*
ATTORNEY 3,557,956

METHOD FOR DE-INKING AND REMOVAL OF CERTAIN CONTAMINANTS FROM RECLAIMED PAPER STOCK

FIELD OF INVENTION

Paper making and fiber liberation, waste papers or textile waste, with organic agent.

RELATED APPLICATION

Reverse cleaning and deinking of reclaimed paper stock, Harry J. Braun, Ser. No. 830,395, filed June 4, 1969.

PRIOR ART

In normal deinking and cleaning of reclaimed paper stock, after the raw material has been defibered and deinked by conventional treatments in the presence of alkali, dispersants and solvents followed by washing, bleaching, if used, and fine screening, a stock slurry of about 0.5 percent (by weight of solids based on total slurry weight) consistency in water is fed at about 45 p.s.i.g. into a centrifugal cleaner. These are generally conical or cylindrical and conical devices having a tangential input pipe in the top and axial outlet nozzles at the top and bottom. The slurry forms a vortex which has an outer downwardly spiraling portion and an inner upwardly spiraling portion. The flow splits, or slurry splits, are controlled primarily by the relative sizes of the outlet nozzles. Generally speaking, the solids which have specific gravities close to or slightly less than water are retained in the inner portion of the vortex (hereinafter "inner Vortex") and exhausted through the top nozzle. This portion of the slurry includes most of the fibers, which range in specific gravity from about 0.98 to 1.40, and the so-called "low density" contaminants, i.e., those with specific gravities of 1.0 and less. The so-called "high density" contaminants, i.e., those with specific gravities of about 1.40 and above, migrate to the outer portion of the vortex and are exhausted through the bottom nozzle. Contaminants with specific densities similar to fiber can go to either portion of the vortex.

The problem with conventional operation of the cleaners is two-fold. First, with the increased use of rubbery and synthetic resin bindings, backings and coatings for paper, those materials, which are considered to be contaminants, find their way into water paper stock, and they are difficult and oftentimes impossible to remove by conventional methods of deinking. When they, along with the fibers, reach the centrifugal cleaner, they, generally having specific gravities less than water, are retained in the inner vortex and are exhausted through the top nozzle along with the fiber accepts.

Second, in addition to these so-called "low density" contaminants, there is a special class of contaminants which have specific gravities greater than water, and would normally be expected to migrate to the outer vortex and be exhausted through the bottom nozzle along with "high density" contaminants, i.e., those with specific densities of from about 1.40 to 8.0 as "rejects." This special class of contaminants, composed mainly of clay and pigment particles, and ink pepper, despite their relatively great specific gravities, ranging from about 2.5 to 3.0, are retained in the inner vortex, and they, too, are exhausted with the fiber "accepts." This, it was found, was because their minute size, shape, or size and shape, gave them high hydraulic drag coefficients, and they moved slower in their passage through the medium and many of them never reached the outer vortex.

The Braun application (supra) discloses a method wherein the cleaner is reversely operated, i.e., the sizes of the nozzles are so related, and the slurry and solids splits are so maintained that the fibers migrate to the outer vortex and are exhausted through the bottom nozzle, and wherein not only are the "low density" contaminants retained in the inner vortex and exhausted through the top nozzle, but also most of the aforesaid special class of contaminants.

However, effective as the aforesaid Braun process has proven to be, there still remains a further class of contaminants which should be retained in the inner part of the vortex, but which frequently ends up in the outer part, from which they are exhausted along with the "high density" contaminants and the fiber "accepts." This further class is composed of organic solids with densities close to that of water, i.e., about 0.96 to 0.98 and ranging from slightly less than 0.96 up to 1.1, and being of plastic, polymeric, adhesive, rubbery, and asphaltic material. Those of this class below density 1.0 remain in the outer vortex because of low settling rates occasioned by small dimensions and/or high aspect ratios. Those of this class above density 1.0 are carried to the outer vortex because of good settling rates occasioned by large dimensions and/or low aspect ratios.

The object now is to improve the Braun process of reverse cleaning by adding to the slurry input to the cleaner a fluid which will selectively act upon this further class of contaminants and cause them to be retained in the inner vortex so as to be exhausted with the other contaminants discussed above. This, in general, entails, in effect, a selective lightening of certain contaminants without affecting the fibers.

These and other objects will be apparent from the following specification and drawing, in which.

Figures 1, 2:
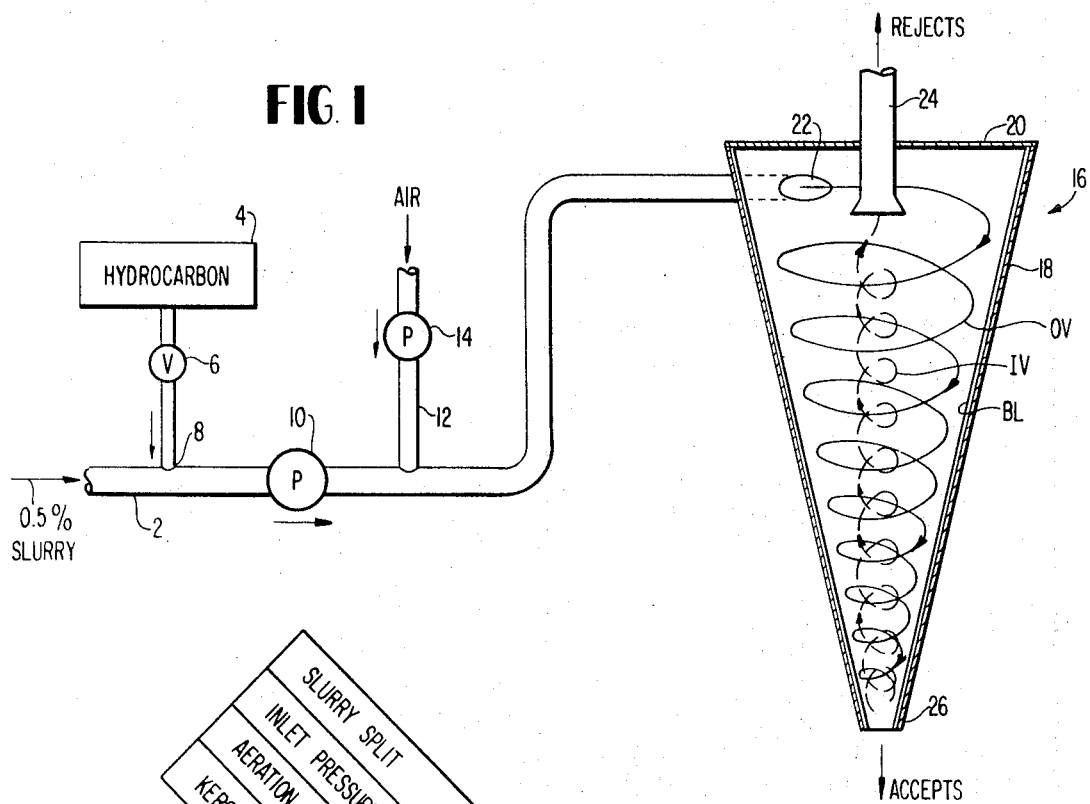
FIG. 1 is a diagrammatic showing of the apparatus used in practicing the subject process.
FIG. 2 is a chart.

To describe first a typical apparatus suitable for practicing the subject method, reference is made to the diagram of FIG. 1 which shows a slurry supply pipe 2, a hydrocarbon supply vessel 4 connected via a valve 6 and suitable injector 8 into supply pipe 2 on the low pressure side of a pump 10. Also connected into supply pipe 2 is an air supply line 12. Various means, such as a pump 14, may be used for introducing air into the slurry, preferably so that the air is either absorbed into the water or, if it remains in bubble form, the bubbles are extremely small, as will be discussed hereinafter.

Centrifugal cleaner 16, in this example, is a standard 3-inch cleaner manufactured by Bauer Brothers, well-known to those skilled in this art. Other suitable types are manufactured by Bird Machinery Company, Nichols Engineering, and others. Centrifugal cleaner 16 has a conical sidewall 18, a closed top 20, a tangential infeed pipe 22 near the top, a top nozzle 24 and a bottom nozzle 26. The slurry input forms a vortex having an outer downwardly spiraling portion OV and an inner upwardly spiraling portion IV. The slurry forms a thin boundary layer BL along the inner side of wall 18. A central upwardly moving column of air enters through the bottom nozzle 26 and is educted through top nozzle 24. Part of the slurry, from the outer vortex OV, containing whatever solids have migrated thereto, is exhausted through bottom nozzle 26, and the remainder of the slurry from the inner vortex IV, containing whatever solids have remained therein, is exhausted through top nozzle 24. The relative sizes of the top and bottom nozzles, for a given slurry infeed pressure, determine the slurry and solids splits. Prior to the Braun process (supra), this type of cleaner was usually operated with a slurry of 0.5 percent consistency, 45 p.s.i.g. infeed pressure, ⅝ inch top nozzle, ⅛ inch underflow nozzle, and the slurry flow split was 3.43 percent by weight underflow and 96.57 percent by weight overflow. In this operation, 84.82 percent by weight of the fibers were taken out with the overflow through the top nozzle as "accepts," but along with them came the "light" contaminants, i.e., solids with specific gravities within and below the range of fiber densities, and also some of the contaminants with specific gravities greater than fibers but which were retained in the inner vortex because their minute size, or size and shape, gave them relatively higher hydraulic drag coefficients.

"Reverse Cleaning," according to Braun (supra) means that the splits are altered as follows. Still with a slurry consistency of about 0.5 percent the infeed pressure was increased, preferably to 90 p.s.i.g., the top nozzle remained at ⅝ inch, but the bottom nozzle was enlarged to ½ inch. This gave a slurry flow split of 51.39 percent by weight underflow, 48.61 percent by weight overflow. In that operation 91.51 percent were exhausted through the bottom nozzle as accepts. That operation has an advantage that not only the truly "low density" contaminants, i.e., those with specific gravities substantially less than water, were retained in the inner vortex, and were exhausted with the overflow through the top nozzle, but also included in the overflow rejects were most of the special class of "high density" contaminants, i.e., those with specific gravities of up to about 2.5 to 3.0 but which, because of minute size, or size and shape, had relatively high coefficients of hydraulic drag with consequent lower radially outward settling velocities than the fibers. However, there were still some plastic, polymeric, adhesive, rubbery and asphaltic materials with specific gravities ranging from about 0.96 to 1.1 with normal settling velocities equal or so close to that of the fibers that they tended either to migrate outwardly with the fibers or to remain in the outer vortex once there, and it is treatment of these so that they will be transferred to or be retained in the inner vortex to which the subject improvement pertains.

We have found ways to increase the size of particles and to decrease apparent specific gravity, and thereby "lighten" (i.e., reduce the radially outward settling velocity) the contaminants permitting their more ready separation by reverse centrifugation (toward the center).

"Lightening" may be achieved with a low density fluid which preferentially wets the contaminant particles. The density of the fluid should be less than that of the contaminant and that of the suspending medium, essentially water for most practical consideration. It may then function in three ways:

1. By lowering the overall density of the contaminant-fluid composite particulate (i.e., particle and lightening fluid);
2. By increasing the volume of the particulate, by its own volume, so that it settles more rapidly in a gravitational field; and
3. By agglomerating contaminant particulates so that they will settle still more rapidly.

If the densities of the fluid, i.e., the additive to induce lightening effect, and the contaminants are the same and both less than that of the water, there will still be a lightening effect due to effects 02 and 03.

If the density of the contaminant is less than that of the water and that of the fluid is intermediate, the effect 01 of density will be in opposition to the lightening effects 02 and 03. With a small amount of fluid, provided its specific gravity is equal to or greater than ⅓ the sum of 2 plus the contaminant specific gravity, particles may be made "heavier," (i.e., given increased radially outward settling velocity) than they originally were by effect 01, or "lighter" by 03. With a large amount, particles will be made "lighter" by effect 02 as well as 03.

Similarly, if the density of the contaminant is less than that of the water but that of the fluid is equal to or even greater than that of the water, it is possible to achieve a "lightening" effect through agglomeration. With increasing density of the fluid above that of the medium, smaller proportions can be tolerated in achieving agglomeration on account of the adverse effect of fluid density.

With contaminant of density equal to that of the water, a fluid of lesser density will achieve lightening by all three aforesaid mechanisms in all proportions.

It is even possible to produce lightening of particles of density greater than that of the medium. In this case, the fluid density must be less than that of the contaminant but preferably also less than that of the water. It must be less than that value which corresponds to ⅔ of the density interval extending from that of the contaminant to that of the water as computed for spherical particles. A fluid whose density is intermediate between those of contaminant and medium and fulfills this condition will tend to "lighten" the contaminant by effect 01 above. As the proportion of fluid increases, this effect will slacken; effects 02 and 03, which are in opposition to it, will first equal it and then proceed to make the composite particle(s) "heavier."

The point of equal opposition between 01 and 02 is readily determined from the densities and proportions involved, by means of Stokes law. As will be shown below, effect 03 though similar in nature to 02, may be far stronger, i.e., operable at lower concentrations of fluid.

Even with a fluid of density less than that of the water, effect 03, that of agglomeration opposes and can overbalance effect 01 of the fluid until sufficient of the latter has been added to bring the composite density of fluid and contaminant down below that of the medium. Effect 02 cannot do this.

Since the fluid must preferentially wet the contaminant, it is helpful to characterize the nature of not only the contaminant but also the medium and associated materials in order to define the properties required of the fluid.

In the paper deinking industry the medium consists of water containing the very hydrophilic or very polar substance, pulp. It may, in addition, contain other very hydrophilic substances, such as salts, clays and other inorganic pigments. Thus, in order to preclude any degree of wetting of pulp, the fluid additive should be nonpolar or hydrophobic. Fortunately, most so-called "light" contaminants remaining after alkaline hydrapulping, particularly the lower density ones, are also nonpolar and hydrophobic and thus are readily distinguishable on this basis from pulp.

Two broad classes of fluid are capable of wetting this type of contaminant completely and pulp not at all. These are inert gases and liquid hydrocarbons, the latter including some hydrocarbons substituted to a limited extent with halogens and other moieties wherein the overall nonpolar character is not jeopardized. The contact angle of water in air on the so-called nonsaponifiable low density plastic materials, is usually in the vicinity of 90° while the interfacial angle between water and a typical aliphatic hydrocarbon oil on such a plastic approaches 180° (measured through the water). By contrast, the contact angle of water on pulp in the presence of a gas or hydrocarbon oil is virtually 0°.

In addition to these desirable surface properties, these two classes of fluids include some of the lowest density of all groups of matter. The inert, for these purposes, gases include the lightest of all substances, hydrogen, as well as carbon dioxide, oxygen and nitrogen; inert gases, such as helium, neon and argon; lower aliphatic hydrocarbons, such as methane, ethane and propane; and others, such as ethyl chloride.

Of the liquid hydrocarbons and substituted hydrocarbons, the lower density ones of the aliphatic group are preferred. In this group are the lowest density condensed phase substances which are stable in air at ambient temperatures. Included are all normal, branched, chain and cyclic aliphatic, saturated and unsaturated, hydrocarbons and mixtures thereof, preferably having from about 5 to 18 carbon atoms and which are liquid at ambient temperatures and atmospheric pressure. The mixtures may contain normally solid hydrocarbons having, e.g., as many as 31 carbon atoms. These materials, all having densities appreciably below that of the medium, water, may function by virtue of effect 01 as well as 02 and 03 above. Examples are listed by categories, there being naturally some overlap in certain examples:

Normal chain aliphatic:
   n-Pentane, n-Octadecane; n-Hentriacontane (80%) and n-octane (20%); 3-heptyne; 1-nonene; n-Tetradecane.

Cyclic aliphatic:
   Cyclopentane; 3-(2'-ethyl-3'-methylpentyl) pentylcycloheptane; 4-isopropyl-1-methyl-3-cyclohexene; n-Pentylcyclobutane; Decahydronaphthalene 2,3,4-trimethyl-1-cyclopentene.

Saturated aliphatic:
   n-Heneicosane (50%) n-heptacosane (50%); n-Heptane; n-Heptadecane; 2-methyl-3-ethyl undecane; Isopropyl cyclohexane; 1,3,5-trimethylcyclohexane.

Unsaturated aliphatic:
   1-octadecyne; 2,2,4,6,8-pentamethyl-4-decene; 2-methyl-5-ethyl-3-tridecene; Hexahydronaphthalene; Cyclopentene.

Branched chain aliphatic:
   2,3-dimethylbutane; 2,2,4-trimethylpentane; 2,4,4,-trimethyl-2-pentene; 4-ethyl-4-methyl-5-butyldodecane; 4,5,6-trimethyl-1-decyne; 3-isopropyl-5-ethyl-6-methyldecane.

A second best group of liquid hydrocarbons is comprised of aromatic and substituted aromatic hydrocarbons with densities less than that of water, e.g., Benzene; o-, m- or p-Xylene; Toluene; Isohexylbenzene; Pentaethylbenzene; 2,2'-dimethylbiphenyl; 1,1-diphenylethane; 1,1-diphenyloctane; 1,10-diphenyldecane.

A third best group of liquid substituted hydrocarbons is comprised of hydrocarbons substituted with chlorine and/or other halogens or the cyano group and/or mixtures of these with members of the preceding two groups, the densities of which liquids and liquid mixtures are less than that of water, e.g., 2-fluoropropane; 1,6-difluorohexane; 1-chlorobutane; 2-10-dichloro-2,10-dimethylundecane; 1-bromooctadecane; p-Fluoro (ethylbenzene); 3-(4-chlorophenyl) hexane; 12-chloro-5-phenyldodecane; n-Butylcyanide; 3-ethylhexylcyanide; 3-fluorobutane; 1-phenyl-4-fluorohexane; m-Fluoroisoamylbenzene; 3-fluoro-4-ethyl-2, 5-dimethylhexane; 2-chloro-10-fluoro-2, 10-dimethylundecane.

A fourth group is comprised as the third but with density greater than that of water, e.g., 2,2,8,8-tetrafluorononane; 1-bromodecane; 1-iodohexadecane; 2,4-dichloropentane; 2,2-dichloro-heptane; o-Chlorotoluene; o-Fluorotoluene.

In view of the pronounced tendency of gases and particularly the above liquids to cover the typical nonsaponifiable low density contaminants, it is understandable that little more than a monolayer would suffice to foster agglomeration among contaminant particles. The decrease in hydrodynamic drag coefficient due to this effect is thus far sooner felt than the similar decrease due to the increase in particle volume resulting from the added fluid.

With either the gaseous or liquid fluid additive the degree of subdivision and dispersion throughout the medium is important. In general, the chances of contaminant and fluid additive coming at least into fruitful collision range increase with increasing subdivisions of the fluid. With the liquid additive, however, it is possible to go too far in this direction to the point where repellent surface charge forces between contaminant and liquid and the low ratio of momentum-to-drag of the latter particles results in failure to coalesce upon impingement. The three major types of surfactant (anionic, cationic and nonionic) produce too fine a liquid particle (less than 1-micron diameter). Dispersion in a high shear field, such as engendered by a Waring blender, also produces too fine a liquid particle (also less than 1-micron diameter). Agitation, such as accompanies impingement of a spray of water formed under a 40 p.s.i.g. head, can be utilized to produce a satisfactory dispersion which is of a particle size from 1 to 15 micron diameter.

Air injected through a porous wall in or close upstream to the centrifuge produces too coarse an air bubble. Inordinately high pressures in conjunction with extremely fine pore sizes would be required to give the proper size bubble for this method to work.

Satisfactory sized bubbles may be generated by supersaturating the medium with respect to the gas, as through a sudden reduction in the pressure on the medium. Conceivably, the same effect could be realized were the supersaturation pressure of gas achieved by chemical means, as for example, generation of $CO_2$ by action of an acid on a carbonate. Various means for performing these processes are well-known.

While the above examples demonstrate the efficacy of both inert gases and low density hydrocarbon type liquids in further "lightening" the low density contaminants for the purpose of more ready separation by inverse centrifugation, further examples demonstrate an unexpected synergistic effect when both gas and liquid are used simultaneously. The following examples show that the effect of simultaneous use is greater than the sum of the two separate usages.

FIG. 2 shows the results of "reversely" operating the cleaner under a number of different conditions. To provide the flow split of 0.5 (by volume) through the top nozzle and 0.5 (by volume) through the bottom nozzle, the diameter size of the top nozzle was 0.484" and the bottom nozzle 0.422". To provide the flow split of 0.2 (by volume) through the top nozzle and 0.8 (by volume) through the bottom nozzle without altering the total rate of flow through the centrifuge, the diameter size of the top nozzle was 0.377" and the bottom nozzle 0.500". In all runs the slurry consistency was about 0.5 percent consisting of uncontaminated fiber pulp. To the slurry was added a contaminant which is characteristic of contaminants which heretofore were particularly difficult to separate from the fibers. This was a microcrystalline wax containing about 6 percent by weight of "Chlorowax 70," the proportion being chosen to produce a mixture having a specific gravity of about 0.96 to 1.0. "Chlorowax 70" (a product of Diamond Alkali) is a mixture of paraffin hyrdocarbons chlorinated to the extent of 70 wt. percent chlorine (Cl:C atomic ratio ≅ 1:1) and having a density of 1.65 gm/cm$^3$, a melting point of 100° C. and a refractive index of 1.535 at 25° C.

The microcrystalline wax used here was the Petrolite Corporation's Crown 23 & 36 grades. This is a mixture of normal, branched and cyclic saturated aliphatic hydrocarbons having molecular weights in the 580—850 range, a minimum melting point of 180° F. (ASTM D127-49), and a density of around 0.95 gm/cm$^3$.

An actual analysis of contaminated bookstock revealed a major proportion of light contaminant to be polyethylene and/or microcrystalline wax. Since "Chlorowax 70" is a commonly used additive for plastics and ink applied to paper, is closely related to the noted contaminants both in chemical constitution and in surface energy and is heavier and thus more difficult to remove by the subject process than said contaminants, it was incorporated in microcrystalline wax and in turn in typical slurries in which the particular type of light contaminant causes the very problem which the subject invention alleviates. The resultant were representative slurries containing the noted light contaminants in a range of particle sizes.

The wax was prepared by spraying it out of a fine orifice into air by such pressure as to produce a range of fine particles of about 250 microns in diameter down to a few microns in diameter. Particles of above 250 microns in diameter were removed by screening, since particles of this size are normally removed by conventional cleaning steps prior to centrifugation. The level of the contaminant introduced into the slurry by thorough mixing was 3 percent weight based on the weight of the dry pulp.

The fraction of contaminant removed by a given treatment appears to be virtually independent of the amount initially present. In view of this, the level of 3 percent contaminant was chosen mainly on the basis of analytical convenience. The levels present in actual practice depend, of course, on the nature of the feed stock; generally they do not exceed this value.

The levels of the variables used in these experiments were chosen mainly on the basis of results from preliminary tests. The Bauer centricleaner employed here was designed for use in the region of 40 p.s.i.g. inlet pressure and this value quite naturally was adopted as one level of operation. The other level, twice this gauge pressure, was chosen because the preliminary work suggested higher efficiencies at higher inlet pressure.

Other previous tests showed that aeration pressure must exceed inlet pressure. The differential or "Aeration pressure increment" was thus employed as the measure of this variable. Comparisons without as well as with this variable were sought.

The high level 40 p.s.i. was experimentally convenient and, for demonstration purposes, sufficient.

The preliminary experiments showed that the liquid hydrocarbon additive should be comparable in weight to the contaminant. For the high level, an effect approaching the maximum was sought by using about five times as much additive as contaminant. This was contrasted with total absence of additive at the low level to show up the full effect.

The levels 0.5 and 0.8 represent reasonable limits to the range of slurry split which are operationally practical.

FIG. 2 shows the improved results of introducing either a gas or a liquid hydrocarbon into the slurry and the synergistic effects of introducing both air and liquid hydrocarbon simultaneously. The data specify the contaminant content of the pulp in percent by weight after treatment, relative to that before (taken as 100 percent by weight). FIGS. of the first row are controls. Those of the second, when compared, show the respective effects of the indicated treatment with air alone. Those of the third row are likewise compared to those of the first row and show the respective effects of the kerosene treatment alone; and those of the fourth row similarly show the combined effects of both air and kerosene. It is seen that in the latter row the relative contaminant content of the pulp are reduced farther below the controls than the sums of the corresponding separate effects of air and kerosene.

The subject process is not applicable to "normal" centrifugation, i.e., wherein the cleaner is operated so as to exhaust the pulp "accepts" through the top nozzle, because then the effective "lightening" of the plastic, polymeric, etc. contaminants having densities within or closely below the densities of pulp (from about 0.9 to 1.4), would cause these contaminants to remain in the inner vortex and be exhausted with the pulp "accepts." However, the subject process is not deleterious to systems wherein "reverse" cleaning is followed by a normal cleaning stage, because the amount of kerosene introduced in performing the subject process is so small that practically all of it is taken up by the rubbery, polymeric, etc., contaminants to which it clings.

For this reason, and for the reasons discussed hereinbefore, the amount of liquid hydrocarbon, in this example, should range from 0.001 to 1.0 percent by weight based on the weight of the slurry. It is preferred that the weight ratio of liquid hydrocarbon, in this case kerosene, to contaminant should be 1:1, which will treat all or most of the oleophilic contaminants that normally occur in the pulp slurry after it has undergone the usual preliminary deinking, washing and screening process.

The following examples are presented solely to illustrate the subject invention and are in no way limitative. In each example typical reclaimed defibered paper stock, having about 0.5 percent by weight (based on entire aqueous slurry weight) of uncontaminated fiber pulp, is passed through a standard 3-inch centrifugal cleaner, such as cleaner 16 in FIG. 1. About 3 percent by weight (based on the weight of uncontaminated fiber) of plastic, polymeric, adhesive, rubbery and/or asphaltic contaminants with specific gravities ranging from slightly less than 0.96 to 1.1 are present in the aqueous feed slurry unless otherwise indicated.

EXAMPLE 1

A flow split of 50 percent by volume through the top nozzle and 50 percent by volume through the bottom nozzle is achieved with a top nozzle having a diameter of 0.484 inch and a bottom nozzle having a diameter of 0.422 inch. The feed slurry is introduced into the centrifugal cleaner at an inlet pressure of 40 pounds per square inch gage (p.s.i.g.). The fiber accepts are withdrawn from the bottom nozzle. In these fiber accepts the polymeric, adhesive, rubbery and/or asphaltic contaminants comprise only 1.215 percent by weight based on the weight of the fiber.

By increasing the inlet feed pressure to 80 p.s.i.g., the noted contaminants in the fiber accepts are reduced to 0.975 percent by weight (same basis).

EXAMPLE 2

Repeating Example 1 with an inlet feed pressure of 40 p.s.i.g., but with aeration of the feed stock at an aeration pressure increment of 40 p.s.i., the noted contaminants in the fiber accepts are reduced to 1.086 percent (same basis). With the same aeration and the inlet feed pressure increased to 80 p.s.i.g., said contaminants are reduced to 0.867 percent by weight.

Replacing the air (in the aeration of the feed stock) with either oxygen, nitrogen, hydrogen, helium, neon, argon or carbon dioxide (at the same pressure) results in essentially the same reduction in the stated contaminants.

Repeating Example 2 under the identical conditions (except that the amount of polymeric, adhesive, rubbery and/or asphaltic contaminants of the indicated density range is only 0.5 percent by weight based on the weight of uncontaminated fiber) results in accepts having 0.181 and 0.145 percent by weight of said contaminants based on the fiber weight (at an inlet feed pressure of 40 and 80 p.s.i.g., respectively).

EXAMPLE 3

Repeating Example 1 with an inlet feed pressure of 40 p.s.i.g., but with introduction into the feed slurry of 0.5 percent by weight (based on the weight of the slurry) of kerosene, the noted contaminants in the fiber accepts are reduced to 0.801 percent (same basis). With the same proportion of kerosene and the inlet feed pressure increased to 80 p.s.i.g., said contaminants are reduced still further, i.e., to 0.345 percent by weight.

Reducing the amount of kerosene to 0.015 percent by weight (based on the total weight of the slurry) yields essentially the same results. Replacing the kerosene with 0.015 percent by weight (same basis) of n-pentane, 2,3-dimethylbutane, toluene or 1,6-difluorohexane yields essentially the same results.

Repeating Example 3 under identical conditions but with a slurry wherein the identified contaminants comprise only 1.0 percent by weight (based on the weight of the uncontaminated fiber) and the proportion of kerosene is only 0.005 percent by weight (based on the weight of the slurry) results in fiber accepts having 0.276 and 0.115 percent by weight (based on the fiber weight) of said contaminants when the inlet pressure is 40 and 80 p.s.i.g., respectively.

EXAMPLE 4

With the same flow split as provided for in Example 1 40 p.s.i. of air pressure increment and 0.5 percent by weight (based on the total slurry weight) of kerosene are introduced into the slurry feed before said feed is passed into the 3-inch centrifugal cleaner. In the fiber accepts there are 0.315 percent by weight (based on the fiber weight) of the stated contaminants when the inlet feed pressure is 40 p.s.i.g. and only 0.228 percent by weight (same basis) of said contaminants when the inlet feed pressure is 80 p.s.i.g.

Reducing the amount of kerosene to 0.015 percent by weight (based on the total slurry weight) does not alter the amount of said contaminant in the fiber accepts when the centrifugal cleaner is operated at an inlet pressure of either 40 or 80 p.s.i.g.

Replacing the kerosene with the same weight proportion of either benzene, cyclohexane or hexahydronaphthalene yields essentially the same results.

Repeating Example 4 under identical conditions but with a slurry wherein the identified contaminants comprise only 2.0 percent by weight (based on the weight of the uncontaminated fiber) and the proportion of kerosene is 0.01 percent by weight (based on the total slurry weight) results in fiber accepts having 0.210 and 0.152 percent by weight (based on the fiber weight) of said contaminants when the inlet pressure is 40 and 80 p.s.i.g., respectively.

EXAMPLE 5

For Examples 5 through 8 a flow split of 20 percent by volume through the top nozzle and 80 percent by volume through the bottom nozzle is achieved with a top nozzle having a diameter of 0.377 inch and a bottom nozzle having a diameter of 0.500 inch. When the slurry feed pressure into the centrifugal cleaner is 40 p.s.i.g., 1.695 percent by weight (based on the weight of the fiber) of said plastic, polymeric, adhesive, rubbery and/or asphaltic contaminants (having specific gravities ranging from slightly less than 0.96 to 1.1) are present in the fiber accepts; when the slurry feed pressure is 80 p.s.i.g., 1.602 percent by weight (same basis) of the said contaminants remain in the fiber accepts.

EXAMPLE 6

When the feed is aerated at a pressure increment of 40 p.s.i. and the slurry feed pressure into the centrifugal cleaner is 40 p.s.i.g., 1.692 percent by weight (based on the weight of the fiber) of said plastic, polymeric, adhesive, rubbery and/or asphaltic contaminants (having specific gravities ranging from slightly less than 0.96 to 1.1) are present in the fiber accepts. With the same aeration but with an increase of the inlet pressure to 80 p.s.i.g., 1.731 percent by weight (same basis) of the said contaminants remain in the fiber accepts.

EXAMPLE 7

When 0.5 percent by weight (based on the weight of the total slurry) of kerosene is incorporated into the feed before the slurry feed in introduced at an inlet pressure of 40 p.s.i.g. into the centrifugal cleaner, only 1.383 percent by weight (based on the weight of the fiber) of said contaminants is found in the fiber accepts.

Repeating the foregoing with only 0.015 percent by weight (based on the weight of the total slurry) of kerosene admixed with the feed, the same results are obtained. Replacing the kerosene by a like weight of a commercial mixture of o-, m- and p-xylene or an 80/20 (v/v) mixture of n-hentriacontane/n-octane yields the same results at both the 0.5 percent by weight level and the 0.015 percent by weight level.

When the inlet pulp contains only 2 percent by weight of said contaminants and 0.01 percent by weight (based on the weight of the total slurry) of valeronitrile is admixed with the feed before introduction of the latter at an inlet pressure of 40 p.s.i.g. into the centrifugal cleaner, 0.922 percent by weight (based on the weight of the fiber) of the said contaminants is found in the fiber accepts.

When 0.5 percent by weight (based on the weight of the total slurry) or kerosene is incorporated into a feed, which contains 3 percent of said contaminants based on pulp weight, before the slurry feed is introduced at an inlet pressure of 80 p.s.i.g. into the centrifugal cleaner, 1.155 percent by weight (based on fiber weight) of said contaminants is found in the fiber accepts.

Replacing the kerosene in the process of the preceeding paragraph with 0.02 percent by weight of 1,1-diphenylethane results in fiber accepts having 1.155 percent by weight (based on fiber weight) of said contaminants.

A reclaimed defibered paper stock feed slurry containing 0.5 percent by weight (based on the weight of uncontaminated fiber) of said contaminants is admixed with 0.003 percent by weight (based on the total slurry weight) of kerosene before introducing said slurry at an inlet feed pressure of 80 p.s.i.g. into a 3-inch centrifugal cleaner. The fiber accepts contain only 0.1925 percent by weight (based on the weight of the fiber) of the said contaminants.

EXAMPLE 8.

When 0.5 percent by weight (based on the weight of the total slurry) of kerosene and 40 p.s.i. of air are incorporated into the feed before the feed slurry is introduced at an inlet pressure of 40 p.s.i.g. into the centrifugal cleaner, 1.011 percent by weight (based on fiber weight) of said contaminants is found in the fiber accepts.

Replacing the kerosene with 0.025 percent by weight (based on the weight of the total slurry) of cyclopentene also results in obtaining fiber accepts with 1.011 percent by weight (based on fiber weight) of said contaminants.

When the inlet feed pulp contains only 1 percent by weight of said contaminants and 0.01 percent by weight (based on the weight of the total slurry) of n-heptane is admixed with the feed before introduction of the latter at an inlet pressure of 40 p.s.i.g. into the centrifugal cleaner, 0.337 percent by weight (based on fiber weight) of the said contaminants is found in the fiber accepts.

When 0.5 percent by weight (based on the weight of the total slurry) of kerosene and 40 p.s.i. of air are incorporated into the feed before the feed slurry is introduced at an inlet pressure of 80 p.s.i.g. into the centrifugal cleaner, 0.801 percent by weight (based on fiber weight) of said contaminants is found in the fiber accepts. Replacing the air with a like amount of either carbon dioxide or hydrogen yields the same results. Reducing the weight percent of kerosene to that of the stated contaminants also produces the same results, as does replacing the kerosene with a like amount of 1,3,5-trimethylcyclohexane.

When 0.005 percent by weight (based on total slurry weight) of kerosene and 40 p.s.i. of air are incorporated into reclaimed defibered paper stock feed slurry containing 1 percent by weight (based on the weight of uncontaminated fiber) of said contaminants before introducing the slurry at an inlet feed pressure of 80 p.s.i.g. into a 3-inch centrifugal cleaner, the fiber accepts obtained from the cleaner contain only 0.267 percent by weight (based on fiber weight) of said contaminants.

EXAMPLE 9

Example 1 was repeated with an inlet pressure of 40 p.s.i.g., but before the slurry was introduced into the centrifugal cleaner, it was aerated in the following manner: it was pumped into a pressure vessel, approximately one-third of this vessel's capacity being occupied by air maintained at 80 p.s.i.g. The slurry and air were then shaken until the rate of further solution of air was negligible, as determined by reduction of pressure when the air supply line was momentarily cutoff (a matter of 2 or 3 minutes). Flexible lines were used to facilitate the shaking of the pressure vessel. The air pressure was then bled down to 40 p.s.i.g. where it was maintained while the slurry was forced through the centrifugal cleaner. The noted contaminants in the fiber accepts are reduced to 1.086 percent (same basis).

Using the same procedure but carrying out the aeration under 120 p.s.i.g. of air pressure and the subsequent centrifugation at 80 p.s.i.g. inlet feed pressure, said contaminants are reduced to 0.867 percent by weight.

Replacing the air (in the above aeration procedure) with either oxygen, nitrogen, hydrogen, helium, neon, argon, or carbon dioxide under the same conditions results in essentially the same reduction in the stated contaminants.

I claim:

1. In centrifugal cleaning of aqueous slurry in a conical cleaner having a tangential inlet feed, a base and an apex, and from which accepts are discharged from the apex with heavier components and rejects are discharged from an axial outlet in the base with lighter components, the improvement wherein fluid which is selectively attracted to heavy contaminants normally discharged from the apex is incorporated in the feed, whereby a proportion of the heavy contaminants is effectively lightened and removed from the axial outlet in the base, the fluid having a specific gravity lower than that of said heavy contaminants.

2. A process according to claim 1 wherein the aqueous slurry is that of reclaimed paper stock.

3. A process according to claim 2 wherein the heavy contaminants are organic in nature and said fluid is in gaseous form.

4. A process according to claim 3 wherein said fluid is air.

5. A process according to claim 2 wherein the heavy contaminants are organic in nature and said fluid is organic, oleophilic and in liquid form.

6. A process according to claim 5 wherein said fluid has a specific gravity less than that of water.

7. A process according to claim 5 wherein said fluid is kerosene.

8. A process according to claim 2 wherein the heavy contaminants are organic in nature and the fluid comprises both gas and liquid.

9. A process according to claim 8 wherein the heavy contaminants have specific gravities ranging from slightly less than 0.96 to 1.1.

10. A process according to claim 8 wherein at least 50 percent by volume of the slurry is discharged from the apex, the inlet feed has a solids concentration of about 0.5 percent by weight based on the weight of the slurry and is at a pressure of at least 40 pounds per square inch, the gas is air, the liquid is kerosene and the weight proportion of contaminants in the accepts is at most about one-third the weight of contaminants in said inlet feed.